US008611658B2

(12) United States Patent
Yamazaki

(10) Patent No.: US 8,611,658 B2
(45) Date of Patent: Dec. 17, 2013

(54) IMAGE PROCESSING APPARATUS AND IMAGE PROCESSING METHOD

(75) Inventor: Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 12/544,699

(22) Filed: Aug. 20, 2009

(65) Prior Publication Data
US 2010/0054586 A1 Mar. 4, 2010

(30) Foreign Application Priority Data

Aug. 26, 2008 (JP) .................................. 2008-217320

(51) Int. Cl.
*G06K 9/34* (2006.01)
*G06K 9/00* (2006.01)
*G06K 9/46* (2006.01)

(52) U.S. Cl.
USPC ............................. 382/173; 382/168; 382/190

(58) Field of Classification Search
USPC .......... 382/163, 164, 167, 275, 266, 268, 269
See application file for complete search history.

(56) References Cited

U.S. PATENT DOCUMENTS

| 5,680,478 A | 10/1997 | Wang et al. ................. 382/176 |
| 2005/0201620 A1* | 9/2005 | Kanamoto et al. ............ 382/182 |
| 2005/0238244 A1 | 10/2005 | Uzawa ........................ 382/242 |
| 2007/0025617 A1* | 2/2007 | Dai et al. ..................... 382/180 |
| 2007/0237422 A1* | 10/2007 | Zhou et al. ................... 382/284 |

FOREIGN PATENT DOCUMENTS

| JP | 4-157578 | | 1/2000 |
| JP | 2004-350240 | | 12/2004 |
| JP | 2005-346137 | | 12/2005 |
| JP | 2009182662 A | * | 8/2009 |
| WO | 2006/066325 A1 | | 6/2006 |

OTHER PUBLICATIONS

U.S. Appl. No. 12/486,245, filed Jun. 17, 2009.

* cited by examiner

*Primary Examiner* — Amir Alavi
*Assistant Examiner* — Kenny Cese
(74) *Attorney, Agent, or Firm* — Fitzpatrick, Cella, Harper & Scinto

(57) ABSTRACT

Image data is divided into blocks and a histogram of a color appearing in a target block is formed. A target color region is decided as significant, if the area of that region is larger than a threshold, or if that area is smaller than the threshold and if that region is located at a boundary of the target block and attribute information for the pixel at the boundary in that region indicates a preset attribute. If that region is not decided as significant, to integrate that region to a region of another color which contacts that region, the color of the pixel in that region is substituted by the other color. If that region is decided as significant and if the chrominance difference between that region and the region decided as significant in another block which contacts the target block is smaller than another threshold, these regions are integrated.

7 Claims, 14 Drawing Sheets

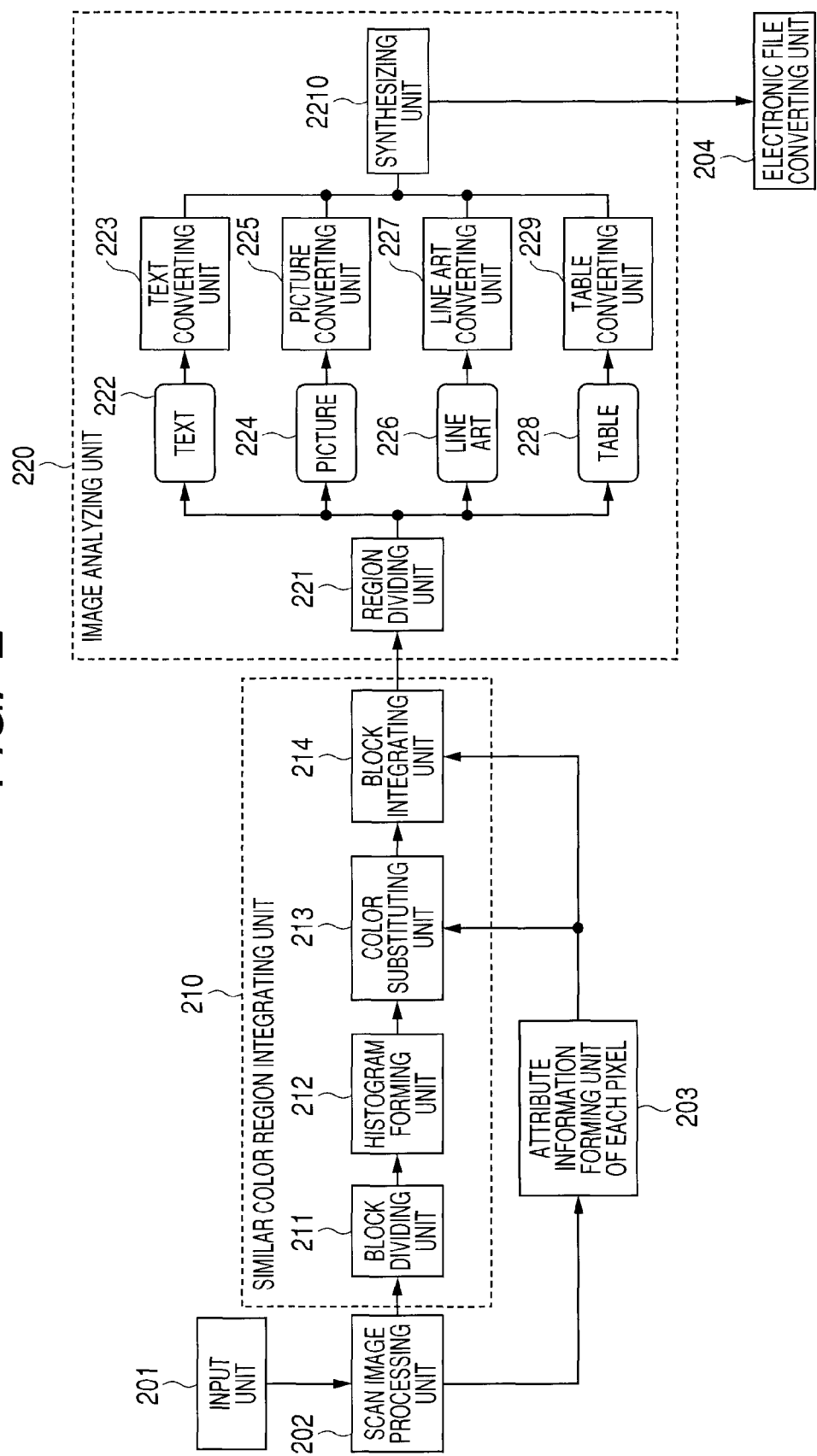

FIG. 8A  FIG. 8B  FIG. 8C
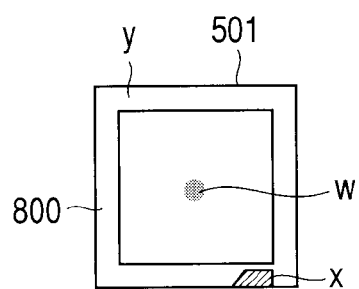
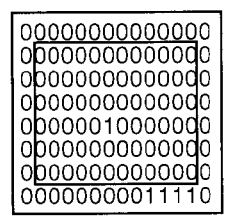
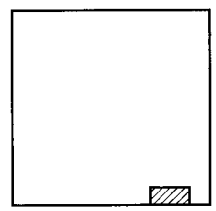
FIG. 8D
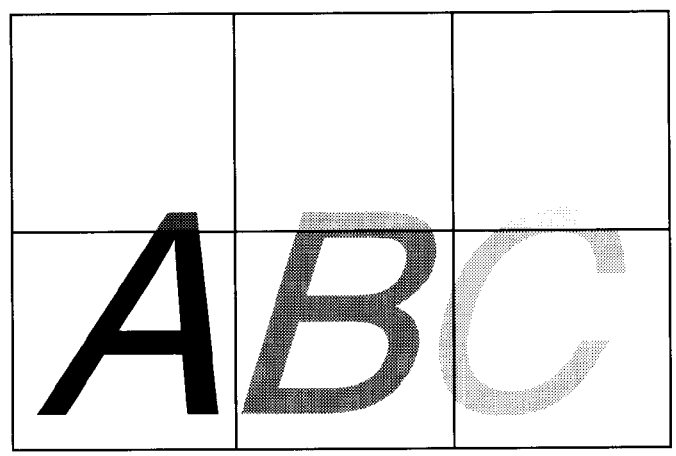

```
00000000000
00001111100
01111111110
01100000110
```

IMAGE PROCESSING APPARATUS AND IMAGE PROCESSING METHOD

BACKGROUND OF THE INVENTION

1. Field of the Invention

The present invention relates to an image processing technique for extracting each element such as text, picture, or the like from image data.

2. Description of the Related Art

As a technique for extracting each element such as text, picture, or the like from image data, for example, such a technique that an input image is divided into a plurality of blocks and color substitution is performed on a block unit basis has been disclosed in the International Publication No. WO2006/066325.

When the image is divided into a plurality of blocks, there is a case where a portion which should inherently be the same region is divided by boundaries of the blocks and becomes micro regions after the division.

However, according to the technique disclosed in the International Publication No. WO2006/066325, there is a case where such micro regions are erroneously discriminated as noise and removed or a region which should inherently be the same region is divided.

SUMMARY OF THE INVENTION

To solve the above problems, according to the invention, there is provided an image processing apparatus comprising: an input unit that inputs image data; an attribute information forming unit that forms attribute information for every pixel of the image data input by the input unit; a dividing unit that divides the image data input by the input unit into a plurality of blocks each having a preset size; a forming unit that forms a histogram of a color which appears in a target block among the plurality of blocks divided by the dividing unit and of the number of pixels; a first deciding unit that, in the case where an area of a region having a target color obtained by the histogram formed by the forming unit is larger than a preset first threshold value, decides the region of the target color as a significant region; a second deciding unit that, in the case where the area of the region having the target color obtained by the histogram formed by the forming unit is equal to or less than the first threshold value and in the case where the region of the target color is located at a boundary of the target block and the attribute information formed by the attribute information forming unit for the pixel at the boundary in the region of the target color indicates a preset attribute, decides the region of the target color as a significant region; a substituting unit that, in the case where the region of the target color is not decided as a significant region by both of the first and second deciding units, in order to integrate the region of the target color to a region of another color with which the region of the target color is in contact, substitutes the other color for a color of the pixel in the region of the target color; and an integrating unit that, in the case where the region of the target color is decided as a significant region by any one of the first and second deciding units and in the case where a chrominance difference between the region of the target color and the region which is decided to be significant in another block which is in contact with the target block is equal to or less than a preset second threshold value, integrates the region of the target color and the region decided to be significant in the other block.

According to the invention, there is provided an image processing apparatus comprising: an input unit that inputs image data; an attribute information forming unit that forms attribute information for every pixel of the image data input by the input unit; a dividing unit that divides the image data input by the input unit into a plurality of blocks each having a preset size; a detecting unit that detects a pattern region having a predetermined periodicity in each of the blocks divided by the dividing unit; and an integrating unit that, (a) in the case where the number of pixels in a target pattern region detected by the detecting unit in a target block among the plurality of blocks divided by the dividing unit is equal to or less than a preset threshold value or (b) in the case where the number of pixels in the target pattern region is lager than the preset threshold value and in the case where the target pattern region is located at a boundary of the target block and the attribute information formed by the attribute information forming unit for the pixel at the boundary in the target pattern region indicates a preset attribute, integrates the target pattern region and a pattern region in another block which is in contact with the target block.

According to the invention, there is provided an image processing apparatus comprising: an input unit that inputs image data on a block unit basis; an attribute information input unit that inputs attribute information which is formed for every pixel of the image data input by the input unit; and an integrating unit that, (a) in the case where a chrominance difference between a first target color region in a target block among the blocks input by the input unit and a second target color region in another block which is in contact with the target block is equal to or less than a preset first threshold value or (b) in the case where the chrominance difference is larger than the preset first threshold value and in the case where the attribute information input by the attribute information input unit for the pixel which is in contact with a boundary in the other block in the first target color region indicates a preset attribute and in the case where the chrominance difference between the first target color region and the second target color region is equal to or less than a preset second threshold value, integrates the first target color region and the second target color region.

According to the invention, the image data can be precisely divided. Therefore, a deterioration in picture quality due to an erroneous division can be also suppressed.

Further features of the present invention will become apparent from the following description of exemplary embodiments with reference to the attached drawings.

BRIEF DESCRIPTION OF THE DRAWINGS

FIG. 2 is a block diagram illustrating a functional construction of an image processing apparatus 100 according to the first embodiment.

FIG. 8A is a diagram illustrating the block 501.

FIG. 8B is a diagram illustrating an example of flag data of the block 501.

FIG. 8C is a diagram illustrating a pixel region 800 obtained after color substitution.

FIG. 8D is a diagram illustrating the image 500 obtained after the color substitution.

DESCRIPTION OF THE EMBODIMENTS

Preferred embodiments of the present invention will now be described in detail in accordance with the accompanying drawings.

First Embodiment

Figure 1:
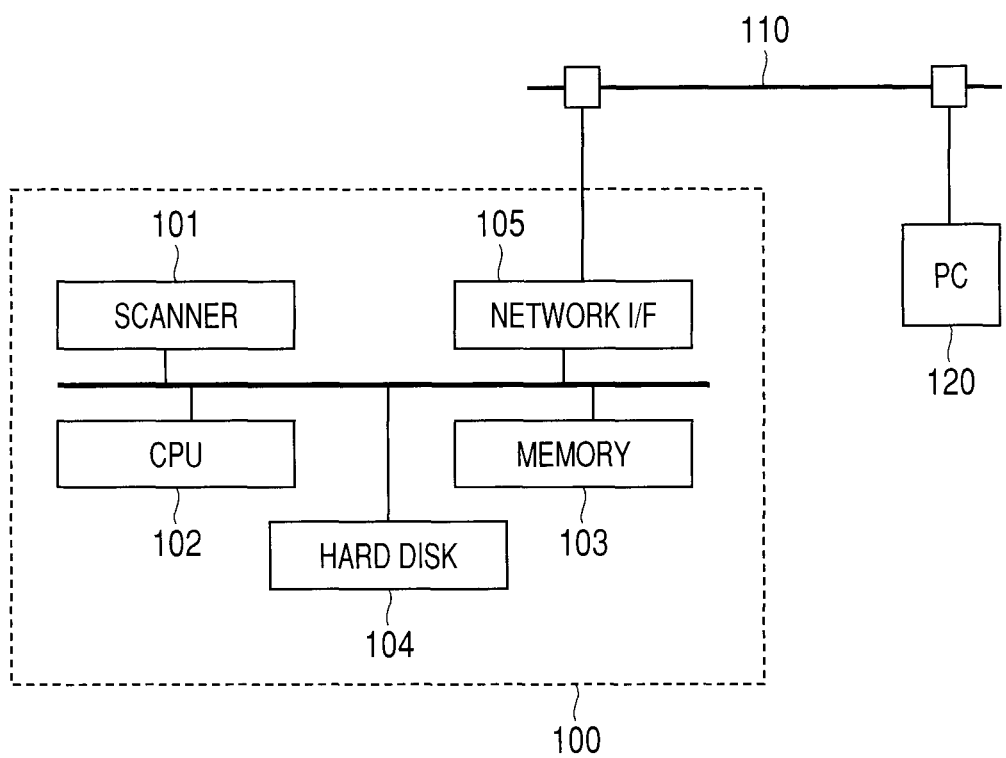
FIG. 1 is a block diagram illustrating a functional construction of a system according to the first embodiment of the invention.

FIG. 1 is a block diagram illustrating a functional construction of a system according to the first embodiment of the invention. An image processing apparatus 100 is provided to realize the invention. The image processing apparatus 100 has: a scanner 101 for converting sheet surface information of a document which was read into image data; and a CPU 102 for executing a program adapted to perform processes of the invention on the image data. The image processing apparatus 100 also has: a memory 103 which is used as a work memory at the time of executing the program, to comprise a memory for temporarily storing data, or the like; a hard disk 104 for storing the program and the data; and a network I/F 105 for inputting/outputting the data to/from an external apparatus. A personal computer (hereinbelow, referred to as PC) 120 is connected to the image processing apparatus 100 by a network such as a LAN 110 and receives the data transmitted from the image processing apparatus 100.

FIG. 2 is a block diagram illustrating a functional construction of the image processing apparatus 100 according to the first embodiment. Although it is assumed that each process shown here is realized by executing an electronic document forming program in the CPU 102, a part or all of them may be constructed by an electrical circuit.

An input unit 201 inputs the document scanned by the scanner 101. A scan image processing unit 202 converts the document into electronic data and forms an image. An attribute information forming unit 203 for each pixel forms attribute data for every pixel.

The attribute data of each pixel denotes a characteristic signal for every pixel by extracting a feature of an original image in order to execute an optimum image process according to the feature of an image included in the original image (hereinbelow, such a signal is referred to as flag data). For example, various kinds of image regions, such as a full-color picture region of continuous gradation, a text region of a single black color, a halftone print region as in a newspaper printing, and the like, exist in the image read out from the original image by an image scanner or the like.

If those image regions are uniformly processed and output by a same image processing procedure, desirable picture quality cannot be generally obtained in output images in many cases. Therefore, the attributes of the image data, included in the original image are detected by using color image data which is input from the input unit 201 and flag data for identifying the attributes of the image data, are formed.

A technique disclosed in Japanese Patent Application Laid-Open No. 2004-350240 can be used as a specific procedure. For example, the processes are executed as follows with respect to a character attribute. That is, attention is sequentially paid to the image data in raster scanning order, a filtering process using a Laplacian filter is executed on the pixels of a predetermined range (for example, 7×7 pixel region) near the target pixel, and if a value of the target pixel is larger than a threshold value, it is decided that such pixels construct an edge. In the case of the pixels for character detection, since the character is constructed mainly by lines, by using a filter corresponding to a relatively low frequency with respect to a predetermined direction, the text region can be efficiently detected.

In the case where a predetermined number or more of pixels which were determined to be the character edge are included in a predetermined region near the target pixel, a corresponding character flag is set as a text region into the target pixel. Naturally, every attribute data is produced according to an image process like a half tone attribute, a graphic attribute, or the like, besides the character attribute.

If a print image is formed by interpreting a PDL command from a page description language, the process can refer to information showing a type of PDL command. In this case, the flag data for identifying the command constructing the text region is detected for every pixel.

In any of the above cases, a signal for outputting one bit, which is set to "1" in the case of the pixels determined to be the character attribute and is set to "0" in the case of other pixels, is issued.

Figure 3A:
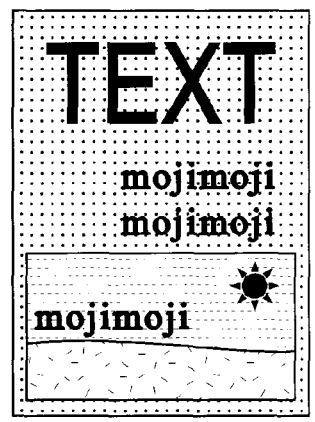
FIG. 3A is a diagram illustrating image data which was input.
Figure 3B:
FIG. 3B is a diagram illustrating attribute data formed from the image data input in FIG. 3A.
Figure 4A:
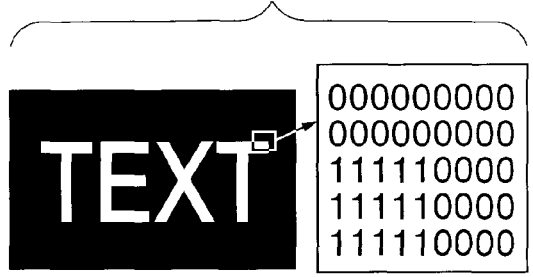
FIG. 4A is a diagram in which the attribute data formed in FIG. 3B is shown by flag data.
Figure 4B:
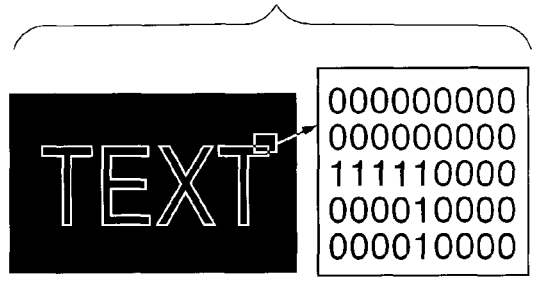
FIG. 4B is a diagram illustrating a modification of the flag data illustrated in FIG. 4A.

FIG. 3A is a diagram illustrating the image data which was input from 201 input unit. FIG. 3B is a diagram illustrating the attribute data formed from the image data input in FIG. 3A. In FIGS. 4A and 4B, FIG. 4A is a diagram in which the attribute data formed in FIG. 3B is shown by the flag data. FIG. 4B is a diagram illustrating another type of the flag data illustrated in FIG. 4A.

For example, when the image data illustrated in FIG. 3A is input, the attribute data of each pixel illustrated in FIG. 3B is formed simultaneously with the image data. The attribute data formed here is information in which a black portion is set to "0" and a white portion is set to "1" as illustrated in FIG. 4A.

Although the attribute data of each pixel is assumed to be the information showing the whole text region in the embodiment, the attribute data may be information showing only an edge portion of the character as illustrated in FIG. 4B.

A similar color region integrating unit 210 color-substitutes a color image and divides an image into similar color regions. There is a case where scan noise and mosquito noise are added to the image which is input and a color tone of the region which inherently has the same color changes delicately. According to the above process, statistics of the color information of the region are obtained and the color substitution of the similar colors is performed.

The similar color region integrating unit 210 has a block dividing unit 211, a histogram forming unit 212, a color substituting unit 213, and a block integrating unit 214.

The block dividing unit 211 divides the image data input by the input unit 201 into a plurality of blocks each having a preset size. The histogram forming unit 212 forms a histogram of the colors and of the number of pixels appearing in the target block divided by the block dividing unit 211. The color substituting unit 213 substitutes another color for the color of the pixels in the region of the target color in order to integrate the region of the target color to the region of another color with which the region of the target color is in contact based on predetermined conditions, which will be described hereinafter. If the predetermined conditions, which will be described hereinafter, are satisfied, the block integrating unit 214 integrates the target region with the region in the block with which the target region is in contact. In the embodiment, the color substituting unit 213 also functions as a first deciding unit and a second deciding unit for deciding that the region of the target color is a significant region, as will be described hereinafter.

Figure 5A:
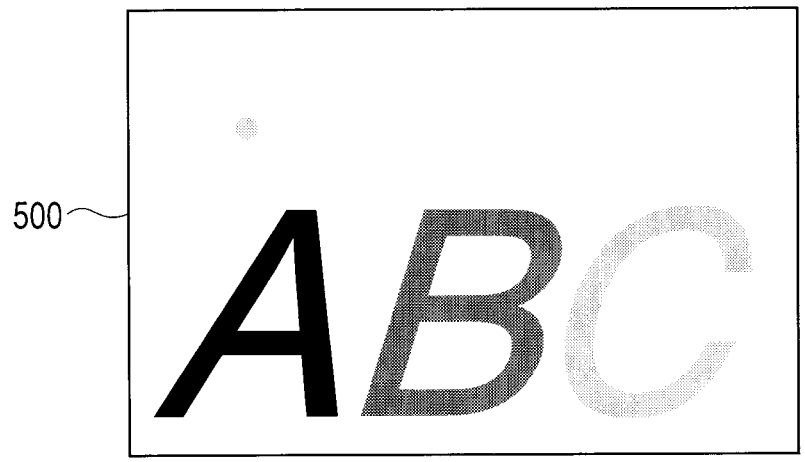
FIG. 5A is a diagram illustrating an image 500 input to a similar color region integrating unit 210.
Figure 5B:
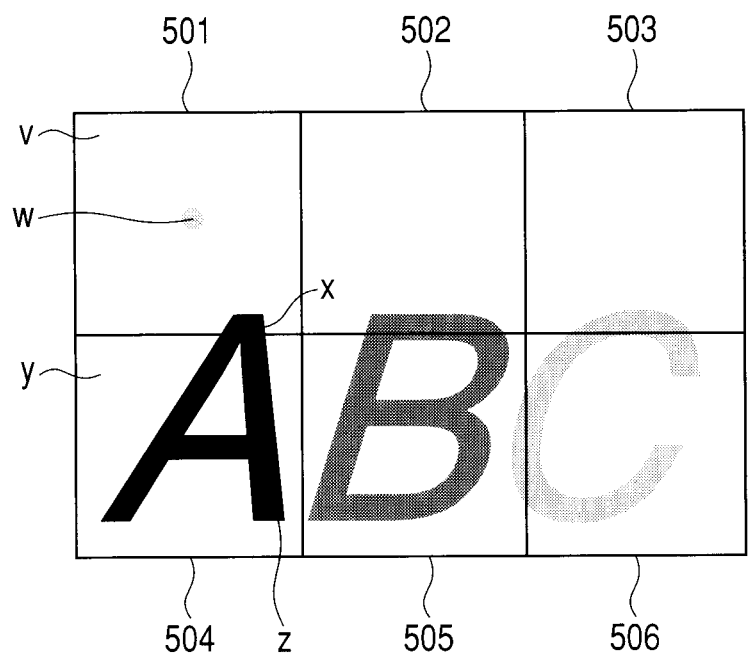
FIG. 5B is a diagram illustrating a state where the image 500 has been divided by a block dividing unit 211.
Figure 6A:
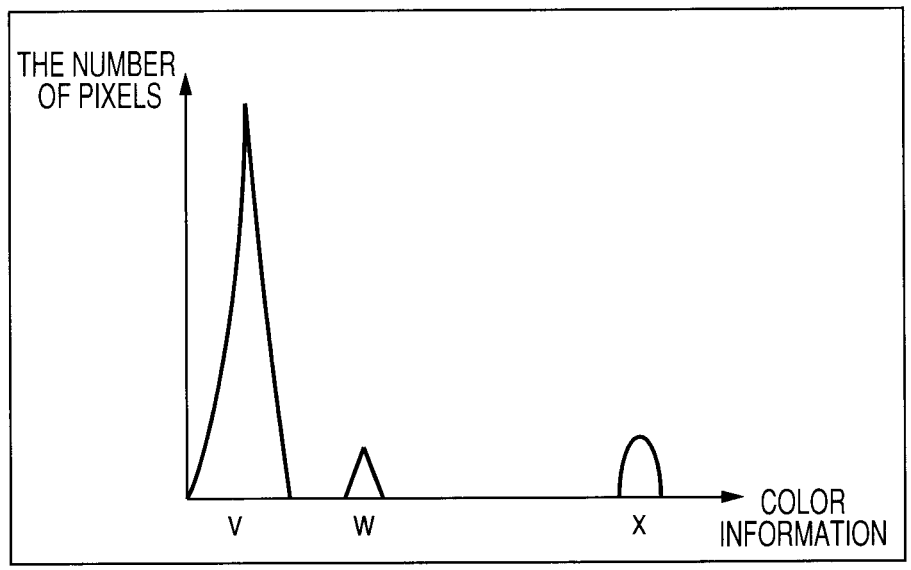
FIG. 6A is a diagram schematically illustrating the distribution of color information of a block 501 illustrated in FIG. 5B.
Figure 6B:
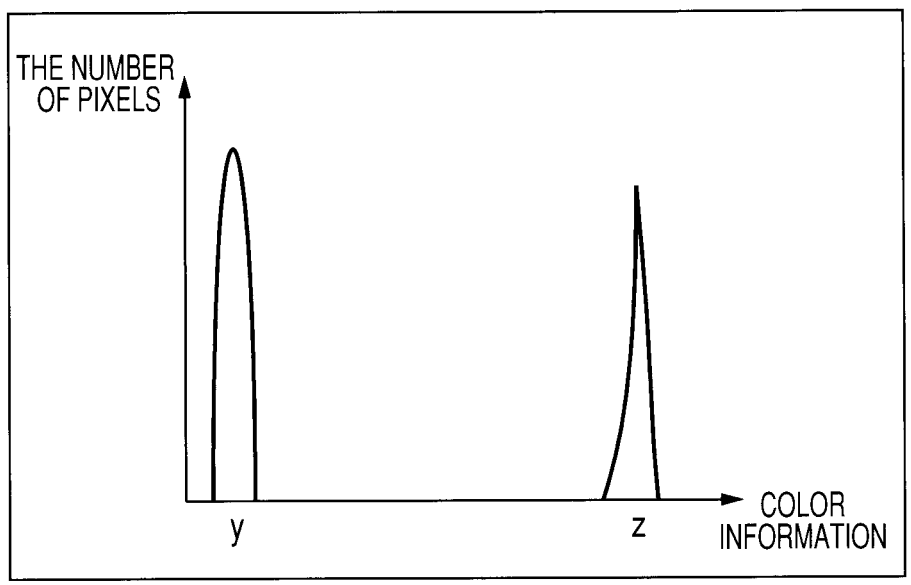
FIG. 6B is a diagram schematically illustrating the distribution of color information of a block 504 illustrated in FIG. 5B.

In FIGS. 5A and 5B, FIG. 5A is a diagram illustrating an image 500 input to the similar color region integrating unit 210. FIG. 5B is a diagram illustrating a state where the image 500 has been divided by the block dividing unit 211. In FIGS. 6A and 6B, FIG. 6A is a diagram schematically illustrating distribution of color information of a block 501 illustrated in FIG. 5B. FIG. 6B is a diagram schematically illustrating distribution of color information of a block 504 illustrated in FIG. 5B.

The aspect (vertical/lateral) size of the block is assumed to be a constant and, in the embodiment, as illustrated in FIG. 5B, the image is divided into six blocks 501, 502, 503, 504, 505, and 506. In the histogram forming unit 212, the color information in the block is extracted by using a well-known technique. The histogram forming unit 212 extracts the color information and its distribution in the embodiment.

In the color substituting unit 213, the pixels in the block are color-substituted by the color information obtained before. An operating procedure of the color substituting unit 213 will be described here with reference to FIG. 7.

Figure 7:
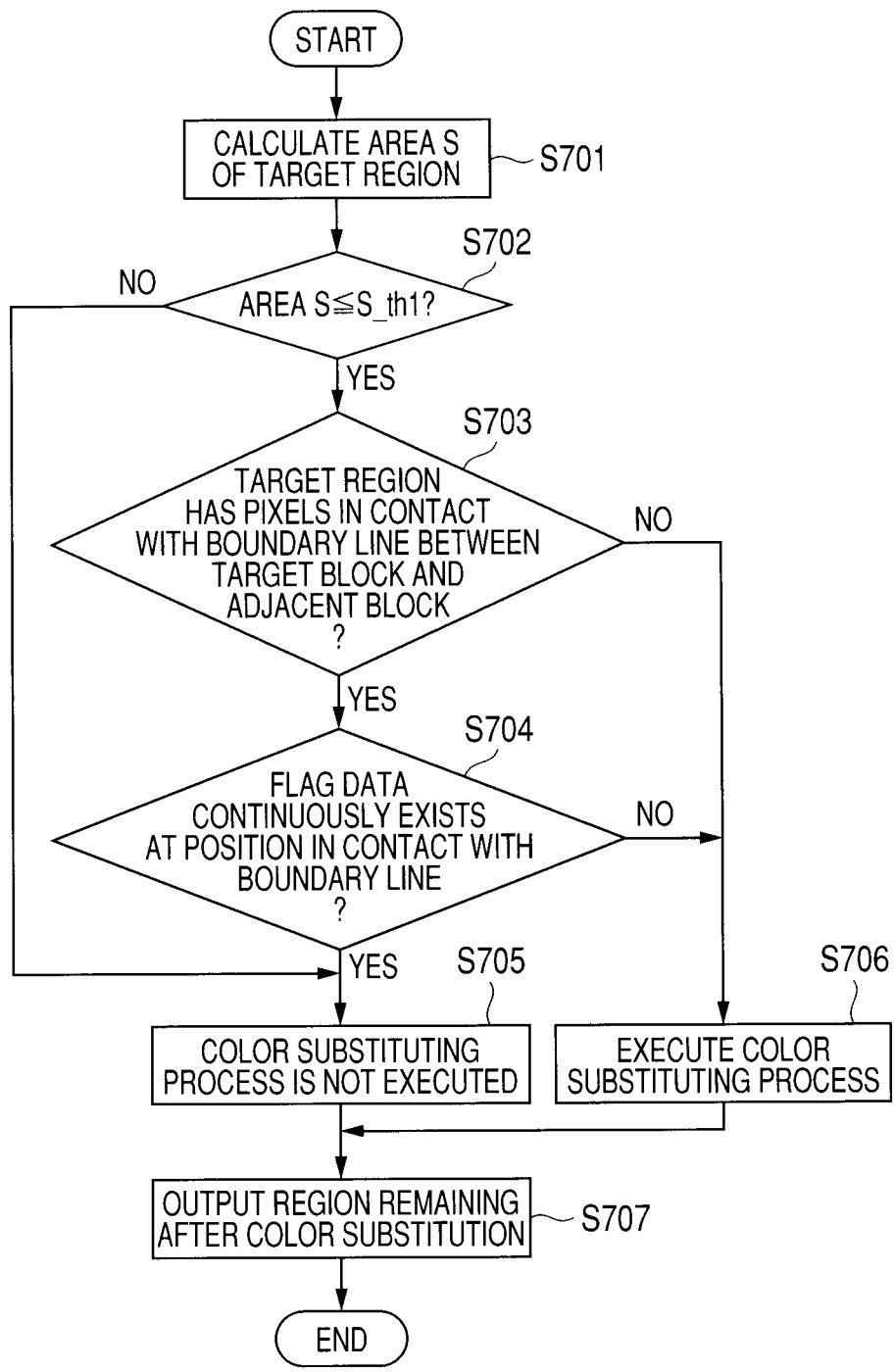
FIG. 7 is a flowchart illustrating an operating procedure of a color substituting unit 213.

FIG. 7 is a flowchart illustrating an operating procedure of a color substituting unit 213. In FIGS. 8A to 8D, FIG. 8A is a diagram illustrating the block 501. FIG. 8B is a diagram illustrating an example of flag data of the block 501. FIG. 8C is a diagram illustrating a pixel region 800 obtained after the color substitution. FIG. 8D is a diagram illustrating the image 500 obtained after the color substitution.

First, in step S701, an area of the target region having the target color obtained in the histogram formed by the histogram forming unit 212 is calculated. That is, based on the foregoing distribution, the regions in which the color information is similar are grouped and the number of pixels is calculated.

Subsequently, in step S702, whether or not an area of the target region is equal to a preset threshold value Th1 or less (first threshold value or less). If it is determined in step S702 that the area of the target region is larger than the threshold value Th1, step S705 follows. In this step, the region of the target color is decided as a significant region and is set as a sole region in such a region without executing the color substituting process.

For example, in the case of the block 501 illustrated in FIG. 5B, since the area of a region v is larger than the threshold value Th1, step S705 follows. Since the area of a region w and the area of a region x are equal to or less than the threshold value Th1, step S703 follows. In the case of the block 504, since both of the area of a region y and the area of a region z are larger than the threshold value Th1, step S705 follows.

A process for regarding a region which is small to a certain extent as noise and substituting a color of another region for such a small region is generally executed. However, even if the area of the region in the block is small, such a small region is a region separated by a boundary of the block and there is a possibility that such a small region is not noise. In the embodiment, therefore, processes in step S703 and subsequent steps are added.

In step S703, whether or not the target region has pixels which are in contact with a boundary line between the target block and its adjacent block is discriminated. The target region may be defined as a region which is located inside by a distance of the pixels in a predetermined range from the boundary line without limiting only to the pixels which are in contact with the boundary line. If it is determined in step S703 that the target region has the pixels which are in contact with the boundary line, step S704 follows. If it is determined in step S703 that the target region does not have the pixels which are in contact with the boundary line, step S706 follows.

In the embodiment, the pixel region 800 illustrated in FIG. 8A is a pixel region which is regarded as an edge of the target block 501. Between the regions w and x in the block 501 in step S703, since the region w is not included in the pixel region 800, step S706 follows, and since the region x is included in the pixel region 800, step S704 follows.

In step S704, by referring to the flag data formed by the attribute information forming unit 203 for each pixel, whether or not the flag data continuously exists at the position which is in contact with the boundary line is discriminated. If it is determined in step S704 that the flag data continuously exists, step S705 follows. If it is determined in step S704 that the flag data does not continuously exist, step S706 follows. In this instance, not only by merely discriminating the presence or absence of the flag, but also by considering the continuity, such a situation that the region is erroneously recognized as a noise is suppressed.

As illustrated in FIG. 8B, the flag is continuously set to "1" at the position corresponding to the region x in the block 501. Therefore, the processing routine advances to a process for handling the region as a sole region in step S705.

When the pixel region 800 is color-substituted in this manner, the state if the image becomes the state as illustrated in FIG. 8C. The region w regarded as scan noise is substituted by the color of the adjacent region. The region x which became a small region by the block division although it had been a large region before the division remains as a sole region without executing the color-substituting process. In step S707, the region remaining after the color substitution is output.

Thus, the state of the image 500 becomes the state as illustrated in FIG. 8D. After that, the region which has been color-substituted on a block unit basis is integrated with the similar color region of the adjacent block by the block integrating unit 214. A detailed operating procedure of the block integrating unit 214 will now be described with reference to FIG. 9.

Figure 9:
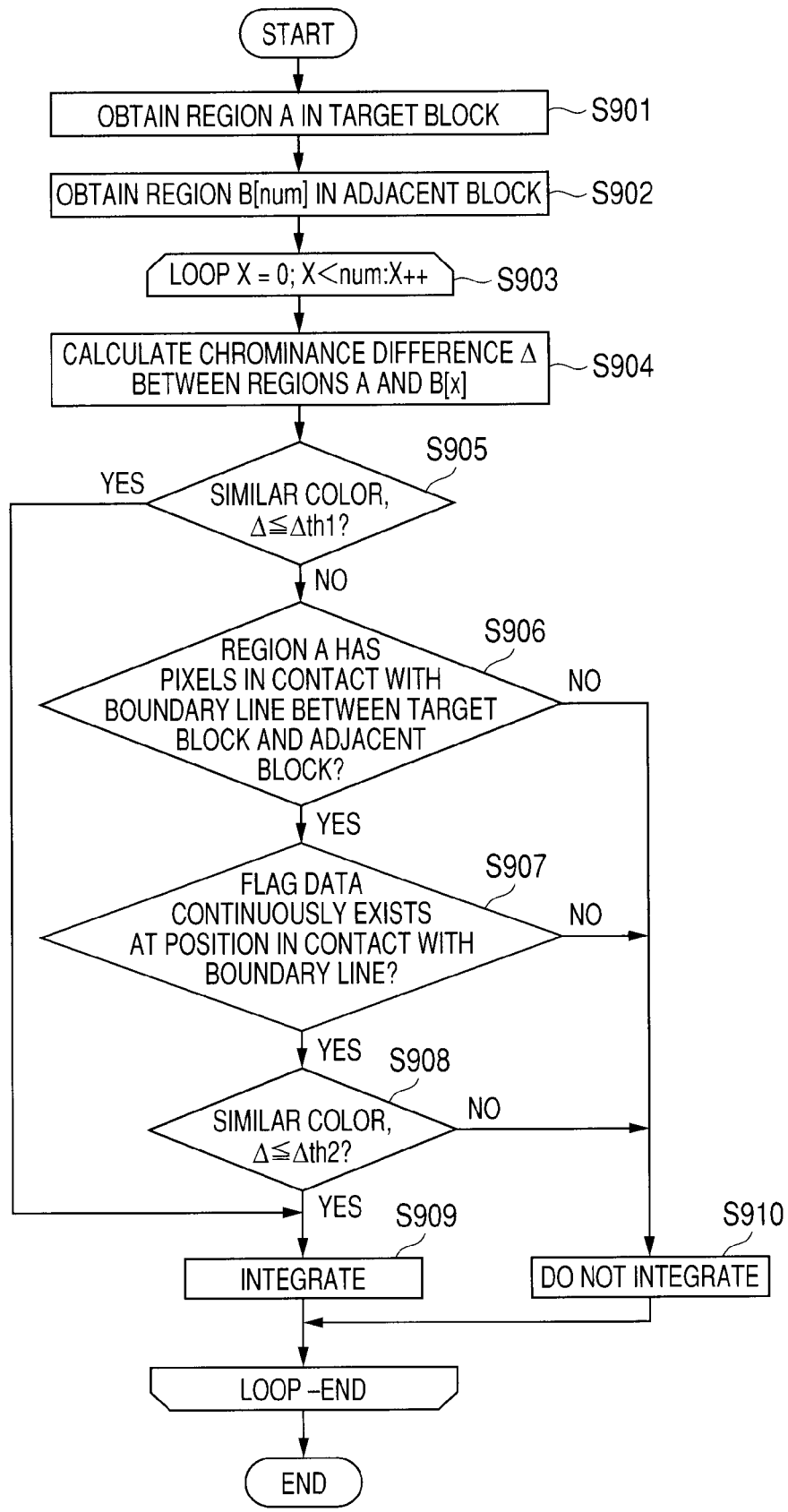
FIG. 9 is a flowchart illustrating an operating procedure of a block integrating unit 214 according to the first embodiment.
Figure 10A:
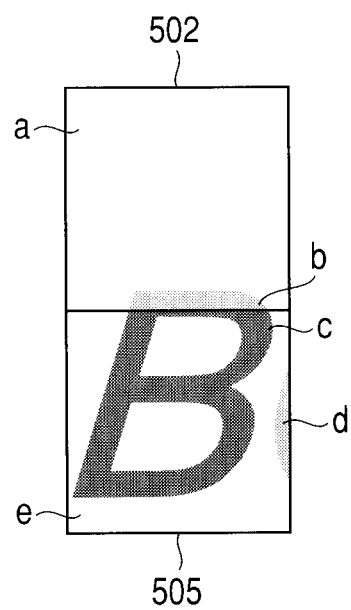
FIG. 10A is a diagram illustrating an example of regions remaining after the color substitution of a target block and an adjacent block.
Figure 10B:
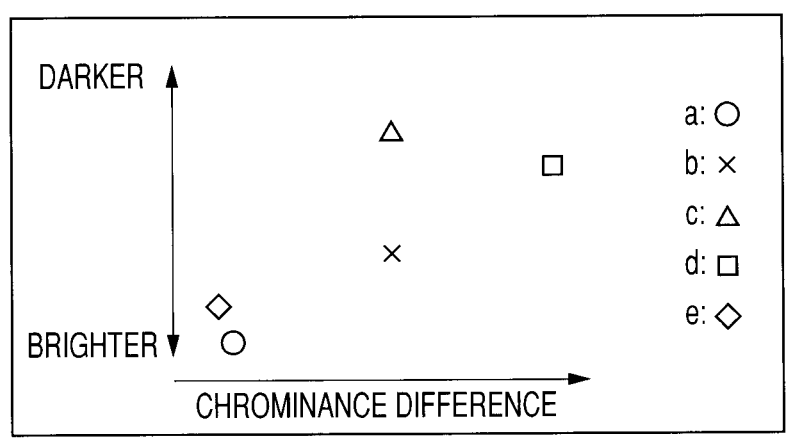
FIG. 10B is a diagram illustrating a graph in which color information of the regions remaining after the color substitution is shown on a schematic color space.
Figures 11A, 11B:
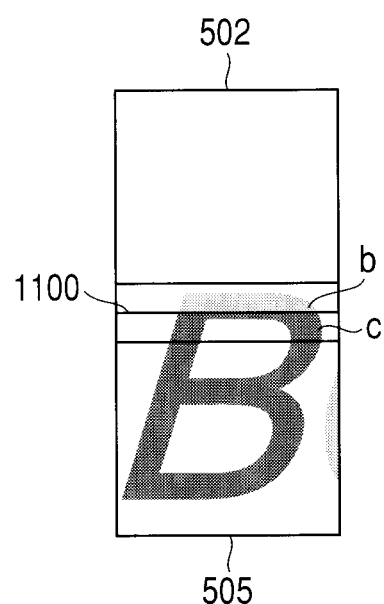
FIG. 11A is a diagram illustrating an example of regions remaining after the color substitution of a target block and an adjacent block.
FIG. 11B is a diagram illustrating an example of flag data of the regions illustrated in FIG. 11A.

FIG. 9 is a flowchart illustrating the operating procedure of the block integrating unit 214 according to the first embodiment. In FIGS. 10A and 10B, FIG. 10A is a diagram illustrating an example of regions remaining after the color substitution of the target block and the adjacent block. FIG. 10B is a diagram illustrating a graph in which the color information of the regions remaining after the color substitution is shown on a schematic color space. In FIGS. 11A and 11B, FIG. 11A is a diagram illustrating an example of regions remaining after the color substitution of the target block and the adjacent block. FIG. 11B is a diagram illustrating an example of the flag data of the regions illustrated in FIG. 11A.

First, a target region A (first target color region) output from the color substituting unit 213 is obtained in step S901. That is, the region A is a region decided as a significant region by any one of the first and second deciding units. In step S902, a region B[num] (second target color region) decided as a significant region in another block adjacent to the target block including the region A is obtained.

In the embodiment, the adjacent blocks are assumed to be blocks which are in contact with the upper side and the left side of the target block serving as a processing target. For example, assuming that the block serving as a processing target is the block 505 illustrated in FIG. 5B, the adjacent blocks are blocks 502 and 504.

Step S903 relates to a loop processing command for allowing processes in step S904 and subsequent steps to be executed for all regions of the adjacent blocks obtained before.

In step S904, a chrominance difference between the color information of the regions A and B is obtained. A well-known technique is used as a method of obtaining the chrominance difference. In the embodiment, it is assumed that a distance between the color information on the general color space is obtained.

In step S905, whether or not the color information of the region A and the color information of the region B[x] are similar is discriminated. For example, whether or not the chrominance difference obtained in step S904 is equal to a preset threshold value Th1 or less (second threshold value or less) is discriminated. If it is determined in step S905 that those color information are similar, the processing routine advances to an integrating process of step S909. If it is determined in step S905 that those color information are not similar, the processing routine advances to a process of step S906.

For example, as illustrated in FIG. 10B, the brightness of the color information of a region a in the block 502 and that of a region e in the block 505 are similar and there is hardly a chrominance difference. Therefore, as illustrated in FIG. 10A, it is regarded that the color information of the region a and the color information of the region e are similar, and the processing routine advances to the integrating process. Since the brightness of the color information of a region b in the block 502 and that of a region c in the block 505 are not similar, it is not regarded that the color information are similar, and the processing routine advances to the process of step S906.

In step S906, whether or not the pixels which are in contact with a boundary line between the target block and the adjacent block exist in the target region (in the first target color region) is discriminated. If it is determined in step S906 that the pixels which are in contact with the boundary line exist, step S907 follows. If it is determined in step S906 that the pixels which are in contact with the boundary line do not exist, step S910 follows.

For example, as illustrated in FIG. 11A, the region b has the pixels which are in contact with the boundary line 1100 between the target block 502 and the block 505 adjacent to the target block. Therefore, step S907 follows.

In step S907, whether or not the flag data continuously exists at the position which is in contact with the boundary line is discriminated with reference to the flag data formed in the region B[x] by the attribute information forming unit 203 of each pixel.

If it is determined in step S907 that the flag data continuously exists, step S908 follows. If it is determined in step S907 that the flag data does not continuously exist, step S910 follows. In this step, not only by merely discriminating the presence or absence of the flag, but also by considering the continuity, the separation from the noise is performed.

FIG. 11B illustrates an example of the flag data existing at the position which is in contact with the boundary line 1100. The flag data of "1" continuously exists near the region b. Therefore, step S908 follows.

If only the processes mentioned above are executed, there is a possibility that although the region B[x] is a part of any one of the above regions, it becomes a small region due to the block dividing process and a result of the color substitution is influenced by the color information which exists dominantly in the block by the color substituting process. Therefore, in step S908, the threshold value Th1 is changed to a threshold value Th2 (third threshold value) which differs from the threshold value Th1 and has a value larger than the threshold value Th1 and the discrimination of the similar color is performed. Since the threshold value Th2 has the value larger than the threshold value Th1, the integrating process can be executed more easily.

That is, in step S908, whether or not the color information of the region A and the color information of the region B[x] are similar is discriminated again. For example, whether or not the chrominance difference obtained in step S904 is equal to the preset threshold value Th2 or less (third threshold value or less) is discriminated.

For example, in the case of the region b in the block 502 illustrated in FIG. 10A, the threshold value Th2 is calculated by a method whereby in the graph illustrated in FIG. 10B, the distance (chrominance difference) regarding the brightness of the color information of the region a having the maximum area in the target block is weighted to the threshold value Th1 in the direction opposite to the region a.

If it is determined in step S908 that the color information are similar, step S909 follows and the integrating process is executed. If it is determined in step S908 that the color information are not similar, step S910 follows and the integrating process is not executed.

Figure 12:
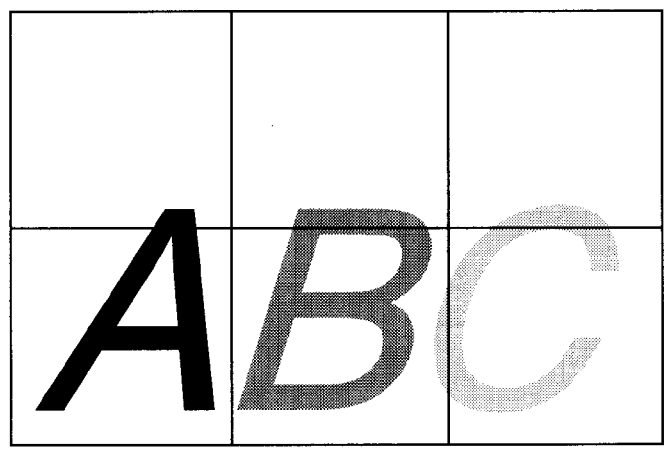
FIG. 12 is a diagram illustrating a state of the image 500 obtained after block integration.

FIG. 12 is a diagram illustrating a state of the image 500 obtained after the block integration. It will be understood that as compared with the characters illustrated in FIG. 8D, characters illustrated in FIG. 12 are divided at boundaries of the blocks and the regions in which the results of the color substitution differ have been integrated. Character information illustrated in FIG. 12 is input to a subsequent image analyzing unit 220.

The image analyzing unit 220 has a region dividing unit 221, a text converting unit 223, a picture converting unit 225, a line art converting unit 227, a table converting unit 229, and a synthesizing unit 2210 for collecting conversion results of those converting units into one information.

The region dividing unit 221 divides an image into a text, a picture, a line art, and a table by using the well-known region dividing technique. As a specific example of the region dividing technique, the process disclosed in the U.S. Pat. No. 5,680,478 or the like can be used.

According to the U.S. Pat. No. 5,680,478, there is disclosed such a technique that a set of black pixel blocks and a set of white pixel blocks in a document image are extracted and characteristic regions such as a character, a drawing, a diagram, a table, a frame, a line, and the like are extracted based on shapes, sizes, states, and the like of the sets. Besides the U.S. Pat. No. 5,680,478, there are the following techniques for extracting a feature amount which is used in the region division: a technique for extracting an approximate color pixel block from an input multivalue image; a technique for extracting the feature amount based on the black pixel blocks obtained by binarizing the multivalue image; a technique for forming differential edge information or the like from the multivalue image and extracting the feature amount as pixels in the edge; and the like. It is assumed that any one of those techniques is used in the embodiment.

To each of the regions divided into a text, a picture, line art, and a table by the region dividing unit 221, the converting process according to each classification is executed. For example, in the text converting unit 223, a character in each text region is recognized by using the well-known character recognizing technique, thereby producing character code data.

Subsequently, a specific example of the character recognizing technique will be described. First, a text line direction of the text region (that is, whether the writing direction is set to a vertical writing or a lateral writing) is discriminated. The text line direction can be discriminated by a method whereby, for example, the image is binarized, projections in the vertical and lateral directions are obtained, and the direction in which projection distribution is lower is set to the text line direction.

Subsequently, the image is divided into each character image. In this instance, it is sufficient to divide the image as follows: that is, a portion between the lines to be cut is detected by using the projection of the binary image to the text line direction, thereby dividing the image into text line images, and further, a portion between the characters to be cut is detected by using the projection of the text line image to the direction perpendicular to the text line, thereby dividing the image into character images.

A feature is extracted for each character image, a character font in which the feature is most approximate is searched for from a dictionary in which features of all character fonts have been stored, and a character code shown in the dictionary is set to the recognition result of each character. In the picture converting unit 225, raster data of high picture quality is produced by using a well-known high resolution converting process.

In the line art converting unit 227, vector drawing data of the line art is produced from the image data of the line art by using a well-known vector forming technique. As a specific example of the vector forming technique, there is a process disclosed in the Japanese Patent No. 3026592, the Japanese Patent Application Laid-Open No. 2005-346137, or the like.

The Japanese Patent No. 3026592 discloses the following technique: that is, while raster-scanning an image, a vector between pixels in the horizontal direction and a vector between pixels in the vertical direction are detected based on a state of a target pixel and states of its neighborhood pixels, and subsequently, an outline of image data is extracted based on a connecting state of the vectors between the pixels, thereby producing information in which a circumference of coupling pixel data called an outline vector is described by a set of vectors between the pixels. The Japanese Patent Application Laid-Open No. 2005-346137 discloses the following technique: that is, an outline vector is approximated by a linear, quadratic, or cubic Bezier curve, and vector description data of high picture quality even if the image is zoomed to a large degree is produced.

In the table converting unit 229, vector drawing data is produced from a ruled line portion by the foregoing well-known vector forming technique and character code data is produced from a character portion by the foregoing well-known character recognizing technique.

In the text converting unit 223, a picture converting unit 225, a line art converting unit 227, or a table converting unit 229, a converting process other than the processes mentioned above may be executed. For example, in the text converting unit 223, a vector conversion may be executed or high picture quality raster data conversion may be executed. In the table converting unit 229, high picture quality raster data may be produced.

Figure 13:
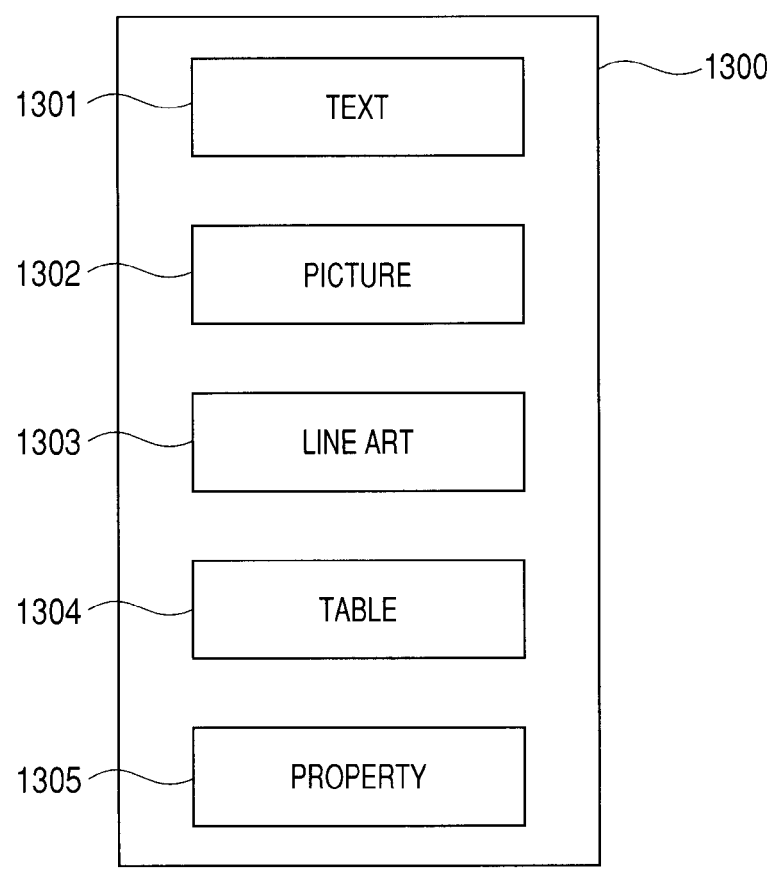
FIG. 13 is a diagram illustrating an example of data synthesized by a synthesizing unit 2210.

The synthesizing unit 2210 synthesizes the data formed from the converting units into one data. FIG. 13 is a diagram illustrating an example of the data synthesized by the synthesizing unit 2210.

A whole construction 1300 of the data produced by the synthesizing unit 2210 is illustrated. A text object 1301 holds a conversion result of the region which has been determined to be a text by the region dividing unit 221 and information indicative of the position in the image. Similarly, conversion results of the regions which have been determined to be a picture, line art, and a table and position information are held in a picture object 1302, a line art object 1303, and a table object 1304, respectively. A property object 1305 has bibliography information of the input data. For example, the number of pages, the page size, input apparatus information, a time stamp, and the like are held.

An electronic file converting unit 204 converts the synthesis data into an electronic file. In the embodiment, the electronic file converting unit 204 converts the synthesis data into an electronic file in which a reproduction, an editing, or the like can be performed by the PC 120.

As mentioned above, according to the embodiment, in the case of the pixels in which the regions remaining after the color substitution are located at the boundary of the block and the flag data corresponding to them continuously exist, the color information is unified by integrating the regions remaining after the color substitution. Thus, the color substitution results can be unified for the regions having the same color information. Consequently, a deterioration in dividing precision of the regions, such as text and a picture in the post process, is prevented and the browsing efficiency and the reusability of the produced electronic file are improved.

Although the attribute information forming unit 203 forms the attribute information fir every pixel of the image data input by the input unit 201 in the embodiment, a construction having an attribute information input unit for inputting attribute information produced by another apparatus into the image processing apparatus according to the invention may be used.

Second Embodiment

Although the above first embodiment has been described by presuming the case of executing the color integrating process with the adjacent block after the color substitution, the second embodiment differs from the first embodiment with respect to a point that a case of executing the integrating process of the regions after a pattern having a predetermined periodicity was detected is presumed. Component elements having constructions similar to those in the first embodiment are designated by the same reference numerals and their description is omitted.

Although the image data as a target of the integrating process is assumed to be monochromatic image data for simplicity of description in the second embodiment, the invention may be applied to RGB image data or CMYK color image data. It is also assumed that the image is constructed by W pixels in the horizontal direction and H pixels in the vertical direction.

Figure 14:
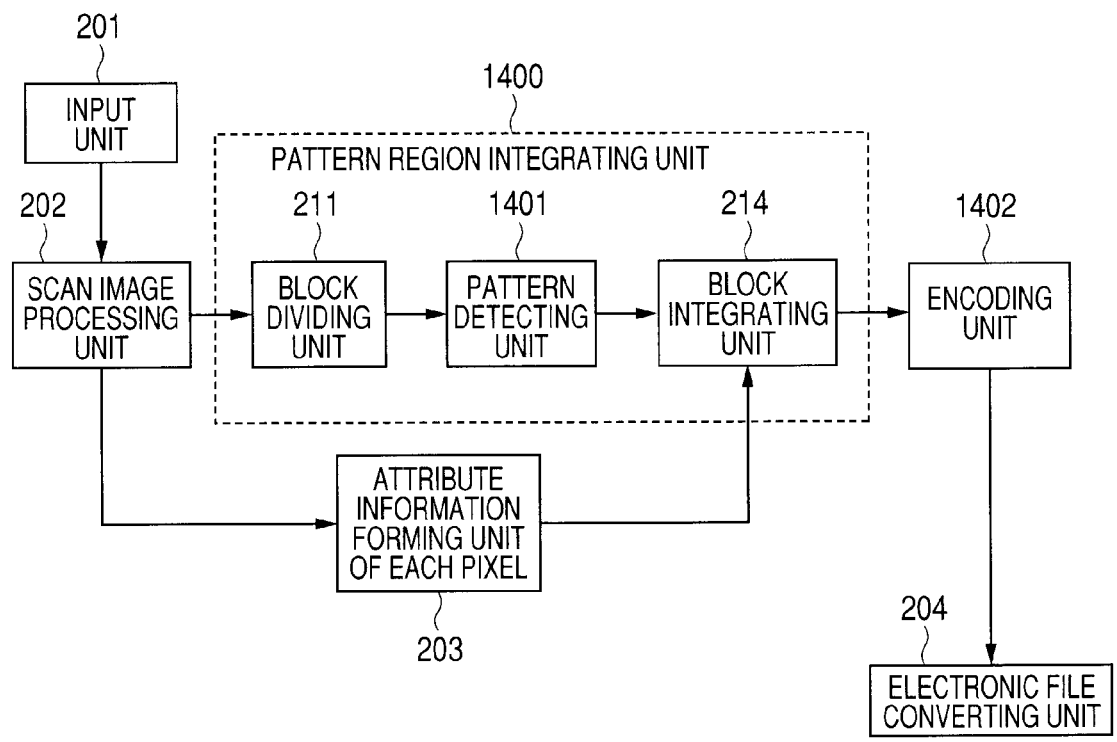
FIG. 14 is a block diagram illustrating a functional construction of an image processing apparatus according to the second embodiment.

FIG. 14 is a block diagram illustrating a functional construction of an image processing apparatus according to the second embodiment. The image processing apparatus according to the second embodiment has fundamentally the same construction as that (refer to FIG. 2) of the first embodiment except that the histogram forming unit 212 and the color substituting unit 213 are replaced by a pattern detecting unit 1401 and the image analyzing unit 220 is replaced by an encoding unit 1402. The pattern detecting unit 1401 detects a pattern having a predetermined periodicity.

Figure 15:
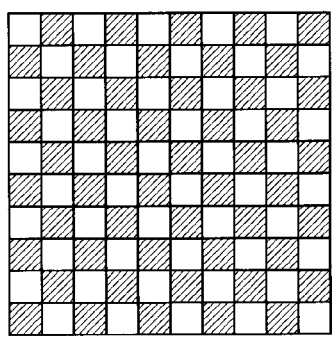
FIG. 15 is a diagram illustrating an example of a pattern having a predetermined periodicity.

FIG. 15 is a diagram illustrating an example of the pattern having the predetermined periodicity. When the pattern is detected, first, a gradation process, such as binarizing process or pseudo multi-gradation binarizing process, is executed on the input data of each block. Subsequently, with respect to each pixel of the gradation-processed data, whether or not it has the same pixel value as that of the adjacent pixel (that is, continuity of the black pixel) is discriminated. The pattern having the predetermined periodicity is detected according to the relation between the number of continuous black pixels in one block and the number of continuous black pixels in another block and the periodicity of the continuous black pixels. For example, in the case of the image as illustrated in FIG. 15, since the number of continuous black pixels is always equal to 0 and has the predetermined periodicity, it is determined that it is a pattern region.

Since there are various kinds of techniques for detecting the pattern having the predetermined periodicity, the detecting method is not limited to the foregoing method. For example, the image data is resolution-converted or sampled and a difference value between an input pixel value of the target pixel and the pixel value obtained after the process is calculated. There is such a feature that when the target region is a pattern region, the calculated difference value is large and when the target region is not the pattern region, the calculated difference value is small. By using such a feature, whether or not the target region is the pattern region can be discriminated.

That is, it is sufficient to use a system in which even in the case where the image data has been read by raster scan and has been divided into predetermined regions (on a block unit basis or the like), the pattern can be detected.

In addition to a position of a region and the number of pixels occupied by the region, information showing whether the region is the pattern region or another region is allocated to a detection result of the pattern with respect to each region in the block serving as a processing target.

Figure 16A:
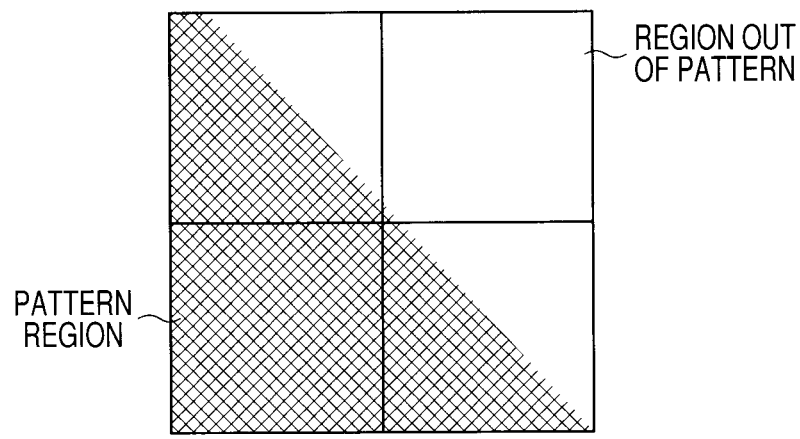
FIG. 16A is a diagram illustrating image data which was input.
Figure 16B:
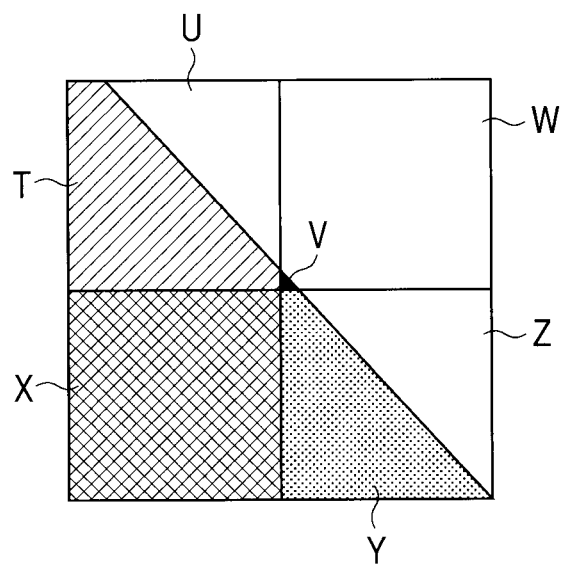
FIG. 16B is a diagram illustrating an example of a pattern detection result.

In FIGS. 16A and 16B, FIG. 16A is a diagram illustrating the image data which was input and FIG. 16B is a diagram illustrating an example of the pattern detection result. That is, when the image data illustrated in FIG. 16A is input, the pattern is detected every block and the result illustrated in FIG. 16B is obtained.

As a result of the pattern detection, the image is divided into regions T, U, V, W, X, Y, and Z. The regions T, V, X, and Y are determined as pattern regions and a signal (Ep=1) including information showing that they are the pattern regions is output as region information. The regions U, W, and Z are determined as regions other than the pattern regions and a signal (Ep=0) including information showing that they are the regions other than the pattern regions is output as region information.

The detection result of the pattern is output to the block integrating unit 214. The block integrating unit 214 obtains the region information which is output from the pattern detecting unit 1401. An operating procedure of the block integrating unit 214 will now be described with reference to FIG. 17.

Figure 17:
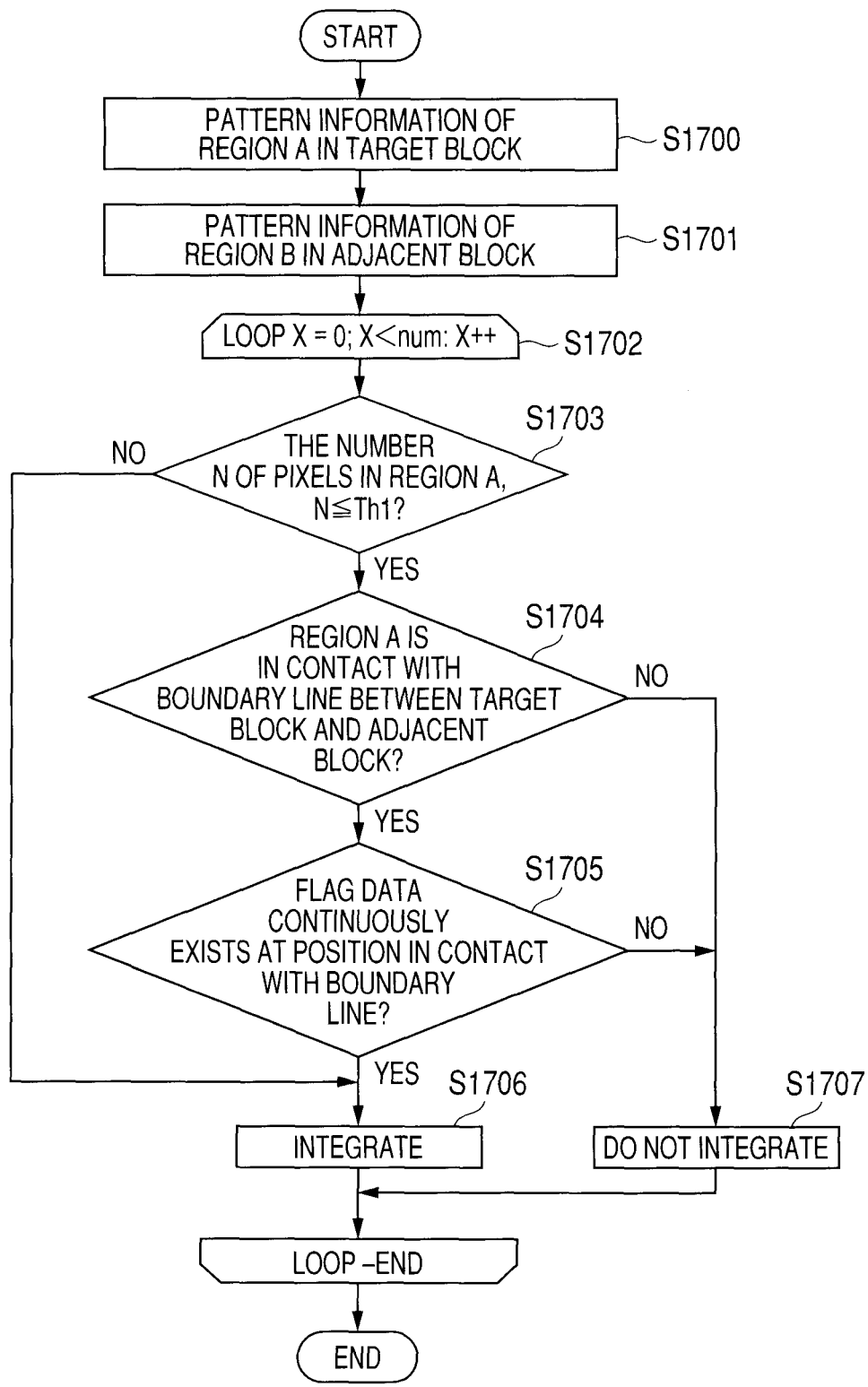
FIG. 17 is a flowchart illustrating an operating procedure of the block integrating unit 214 according to the second embodiment.

FIG. 17 is a flowchart illustrating the operating procedure of the block integrating unit 214 according to the second embodiment. In the embodiment, it is assumed that although the block integrating unit 214 executes the process when the pattern regions exist in the target block, it does not execute the integrating process in the case where no pattern regions exist.

First, in step S1700, information of the region of Ep=1 (that is, the pattern region) in the target block (hereinbelow, such information is referred to as region information) is obtained. Subsequently, in step S1701, region information of the blocks adjacent to the target block is obtained. Next, step S1702 follows and relates to loop processing for allowing processes in step S1703 and subsequent steps to be executed.

Subsequently, in step S1703, whether or not the number N of pixels occupied by the pattern region A in the target block is equal to or less than the preset threshold value Th1 (N≤Th1) is discriminated. If it is determined in step S1703 that the number N of pixels is larger than the preset threshold value Th1 (N>Th1), step S1706 follows. If it is determined that the number N of pixels is equal to or less than the preset threshold value Th1 (N≤Th1), step S1704 follows.

Generally, when a ratio of the area occupied by the pattern region in the block is very smaller than the area of the block, the possibility that such a region is noise is high. If such an encoding system as to encode the periodicity is applied to the block in which the pattern region is very small, encoding efficiency deteriorates. Therefore, even if the pattern region exists in the block, when the ratio of the area occupied by the region is very small, it is determined that such a block is not the block including the pattern.

However, when the pattern region is a region divided by the boundary of the block although the area in the block is small, such a pattern region is divided by another encoding system for every block in spite of a fact that it is the same pattern region, so that a deterioration in picture quality becomes remarkable. To solve such a problem, processes in step S1704 and subsequent steps are provided. The predetermined threshold value Th1 may be a value obtained based on the relation between the block size and the encoding efficiency or may be a preset fixed value.

In step S1704, whether or not the region A as a target pattern region is in contact with the boundary line between the target block and the adjacent block including the region B is discriminated. If it is determined in step S1704 that the region A is in contact with the boundary line, step S1705 follows. If it is determined in step S1704 that the region A is not in contact with the boundary line, step S1707 follows.

In step S1705, whether or not the attribute information formed by the attribute information forming unit 203 for the pixels at the boundary in the target pattern region indicates a preset attribute is discriminated. In other words, in the embodiment, whether or not the flag data continuously exists at the position which is in contact with the boundary line is discriminated. The flag data indicates the attribute information of the pixel unit produced in the first embodiment.

If it is determined in step S1705 that the flag data continuously exists, step S1706 follows. If it is determined in step S1705 that the flag data does not continuously exist, step S1707 follows.

In step S1706, the region A as a target pattern region and the region B[x] as a pattern region in another block which is in contact with the target block are integrated. This is because even when the number of pixels of the target pattern region is small, the region is determined to be a part of the pattern region divided by the block boundary and the encoding system is unified with that of the adjacent block.

In step S1707, the region A and the region B[x] are not integrated. This is because since the target pattern region has a small area and is an independent region, it is decided as noise and there is no need to unify the encoding system with that of the adjacent block.

Such a process is executed to all pattern regions existing in the block (step S1702). For example, when paying an attention to the region V in FIG. 16B, first, since the area occupied in the block is small as a result of the discrimination in step S1703, the processing routine advances to the process of step S1704. Since the region V is in contact with the boundary line of the left block, the processing routine advances to the process of step S1705 and the flag data of the block boundary is referred to. Thus, since the flag data continuously exists, step S1706 follows and the region V and the region T in the left block are integrated.

The block integrating unit 214 outputs an integration result to the encoding unit 1402. The encoding unit 1402 obtains the image data and the integration result and executes the encoding every block. At this time, the encoding is performed to the integrated block by the same encoding system as that of the integrated adjacent pixel.

Upon encoding, a reversible encoding system suitable for the pattern such as a system for encoding the periodicity is applied to the block which has been determined so that the pattern region exists. If it is decided that the region is a region other than the pattern, an irreversible encoding system, such as JPEG suitable for the encoding of a natural picture, is applied.

As mentioned above, according to the embodiment, in the case of the pixel, in which the pattern region is located at the boundary of the block and the flag data corresponding to it, continuously exists, the pattern region is integrated and the encoding system is unified. Thus, since the encoding system can be unified for the same pattern region, the deterioration in picture quality due to the encoding can be suppressed.

Other Embodiments

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-217320, filed Aug. 26, 2008, which is hereby incorporated by reference herein in its entirety.

What is claimed is:

1. An image processing apparatus comprising:
   an input unit that inputs image data;
   an attribute information forming unit that forms attribute information for every pixel of the image data input by the input unit;
   a dividing unit that divides the image data input by the input unit into a plurality of blocks each having a preset size;
   a histogram forming unit that forms a histogram of colors which appear in a target block among the plurality of blocks divided by the dividing unit and of the number of pixels of each color;
   a first deciding unit that, in the case where an area of a region having a target color obtained by the histogram formed by the histogram forming unit is larger than a preset first threshold value, decides that the region having the target color is a significant region;
   a second deciding unit that, in the case where the area of the region having the target color obtained by the histogram formed by the histogram forming unit is equal to or smaller than the first threshold value and in the case where the region having the target color is located at a boundary of the target block and the attribute information formed by the attribute information forming unit for the pixel at the boundary in the region having the target color indicates a character attribute, decides that the region having the target color is a significant region;
   a substituting unit that, in the case where the region having the target color is not decided to be a significant region by either one of the first and second deciding units, substitutes a color of another region adjacent to the region having the target color within the target block for a color of the pixel in the region having the target color; and
   an integrating unit that, in the case where the region having the target color is decided to be a significant region by any one of the first and second deciding units and in the case where a chrominance difference between the region having the target color and another region, which is decided to be a significant region in another block adjacent to the target block, is equal to or less than a preset second threshold value, integrates the color of the region having the target color and a color of the other region decided to be the significant region in the other block.

2. An apparatus according to claim 1, wherein in the case where the chrominance difference is larger than the second threshold value, in the case where the region having the target color is located at the boundary of the target block and the attribute information formed by the attribute information forming unit for the pixel at the boundary of the other block in the other region indicates the preset attribute, and in the case where the chrominance difference between the region having the target color and the other region in the other block is equal to or less than a third threshold value different from the second threshold value, the integrating unit integrates the color of the region having the target color and the color of the other region decided to be the significant region in the other block.

3. An apparatus according to claim 2, wherein the third threshold value is larger than the second threshold value.

4. An apparatus according to claim 1, wherein the attribute information forming unit forms the attribute information of a target pixel based on whether or not a region near the target pixel includes a predetermined number or more of pixels determined to be edges.

5. An apparatus according to claim 1, wherein the attribute information forming unit forms the attribute information based on whether or not a target pixel is included in a text region.

6. An image processing method comprising:
   inputting image data;
   forming attribute information for every pixel of the input image data;
   dividing the input image data into a plurality of blocks each having a preset size;
   forming a histogram of colors which appear in a target block among the plurality of divided blocks and of the number of pixels of each color;
   in the case where an area of a region having a target color obtained by the formed histogram is larger than a preset first threshold value, deciding in a first deciding step that the region having the target color is a significant region;
   in the case where the area of the region having the target color obtained by the formed histogram is equal to or smaller than the first threshold value and in the case where the region having the target color is located at a boundary of the target block and the formed attribute information for the pixel at the boundary in the region having the target color indicates a character attribute, deciding in a second deciding step that the region having the target color is a significant region;
   in the case where the region having the target color is not decided to be a significant region in either one of the first deciding step and the second deciding step, substituting a color of another region adjacent to the region having the target color within the target block for a color of the pixel in the region having the target color; and
   in the case where the region having the target color is decided to be the significant region in any one of the first deciding step and the second deciding step and in the case where a chrominance difference between the region having the target color and another region, which is decided to be a significant region in another block adjacent to the target block, is equal to or less than a preset second threshold value, integrating the color of the region having the target color and a color of the other region decided to be the significant region in the other block.

7. A non-transitory computer-readable storage medium which stores a computer program, wherein the computer program allows the computer to execute an image processing method comprising:
   inputting image data;
   forming attribute information for every pixel of the input image data;
   dividing the input image data into a plurality of blocks each having a preset size;
   forming a histogram of colors which appear in a target block among the plurality of divided blocks and of the number of pixels of each color;
   in the case where an area of a region having a target color obtained by the formed histogram is larger than a preset first threshold value, deciding in a first deciding step that the region having the target color is a significant region;
   in the case where the area of the region having the target color obtained by the formed histogram is equal to or smaller than the first threshold value and in the case where the region having the target color is located at a boundary of the target block and the formed attribute information for the pixel at the boundary in the region having the target color indicates a character attribute, deciding in a second deciding step that the region having the target color is a significant region;
   in the case where the region of the target color is not decided to be a significant region by either one of the first deciding step and the second deciding step, substituting a color of another region adjacent to the region having the target color within the target block for a color of the pixel in the region having the target color; and
   in the case where the region having the target color is decided to be the significant region in any one of the first deciding step and the second deciding step and in the case where a chrominance difference between the region having the target color and another region, which is decided to be a significant region in another block adjacent to the target block, is equal to or less than a preset second threshold value, integrating the color of region having the target color and a color of the other region decided to be the significant region in the other block.

* * * * *